(12) United States Patent
Schmidt et al.

(10) Patent No.: US 7,268,305 B2
(45) Date of Patent: Sep. 11, 2007

(54) ELASTOMERIC VEHICLE CONTROL SWITCH

(75) Inventors: Robert M. Schmidt, Livonia, MI (US); Mark G. Feldman, Farmington Hills, MI (US); James B. Wright, Sterling Heights, MI (US)

(73) Assignee: Lear Corporation, Southfield, MI (US)

( * ) Notice: Subject to any disclaimer, the term of this patent is extended or adjusted under 35 U.S.C. 154(b) by 96 days.

(21) Appl. No.: 11/055,325

(22) Filed: Feb. 10, 2005

(65) Prior Publication Data

US 2006/0186737 A1 Aug. 24, 2006

(51) Int. Cl.
*H01H 13/70* (2006.01)
*H01H 25/00* (2006.01)
*H01H 25/04* (2006.01)

(52) U.S. Cl. ............... 200/5 R; 200/1 B; 200/339; 200/6 R

(58) Field of Classification Search ............... 200/5 R
See application file for complete search history.

(56) References Cited

U.S. PATENT DOCUMENTS

| | | | |
|---|---|---|---|
| 4,584,546 A | 4/1986 | Hattori et al. | |
| 4,654,487 A | 3/1987 | Sawada | |
| 4,899,063 A | 2/1990 | Suck | |
| 5,329,163 A | 7/1994 | Satoh et al. | |
| 5,412,166 A | 5/1995 | Krupp et al. | |
| 5,414,231 A | 5/1995 | Sato et al. | |
| 5,426,275 A | 6/1995 | Maeda et al. | |
| 5,430,261 A * | 7/1995 | Malone | 200/1 B |
| 5,468,926 A | 11/1995 | Sato | |
| 5,647,478 A | 7/1997 | Hirai | |
| 5,669,487 A * | 9/1997 | Sakata | 200/339 |
| 5,693,920 A | 12/1997 | Maeda | |
| 5,719,361 A * | 2/1998 | Lee | 200/1 B |
| 5,783,785 A | 7/1998 | Furukawa | |
| 5,834,716 A | 11/1998 | Lee | |
| 5,920,042 A | 7/1999 | Gotoh | |
| 6,054,655 A | 4/2000 | Rudolph et al. | |
| 6,215,201 B1 | 4/2001 | Numata et al. | |
| 6,437,259 B1 * | 8/2002 | Geppert et al. | 200/5 R |
| 6,737,592 B1 * | 5/2004 | Hoang et al. | 200/1 B |
| 6,750,406 B2 | 6/2004 | Komatsu et al. | |
| 6,833,517 B2 * | 12/2004 | Sotome et al. | 200/5 R |
| 7,084,360 B2 * | 8/2006 | Schmidt et al. | 200/5 R |

FOREIGN PATENT DOCUMENTS

EP 0 604 837 A1 7/1994

* cited by examiner

*Primary Examiner*—Elvin Enad
*Assistant Examiner*—Lheiren Mae A. Anglo
(74) *Attorney, Agent, or Firm*—MacMillan, Sobanski & Todd, LLC

(57) ABSTRACT

A vehicle control switch assembly for use with a printed circuit board that includes a switch having an elastomeric pad portion and a first insert interface attached to the pad. The assembly also includes first and second electrical contacts, each contact being selectively operable to actuate a vehicle function. The switch assembly also includes a pivotable beam member bridging a span between the first electrical contact and the second electrical contact. Movement of the switch in a first direction causes the first insert interface to depress the beam member thereby engaging the first electrical contact with the printed circuit board to actuate the first electrical contact. Further movement of the switch in the first direction causes the first insert interface to slide along the beam member in a second direction to further depress the first beam member thereby actuating the first electrical contact and the second electrical contact.

2 Claims, 4 Drawing Sheets

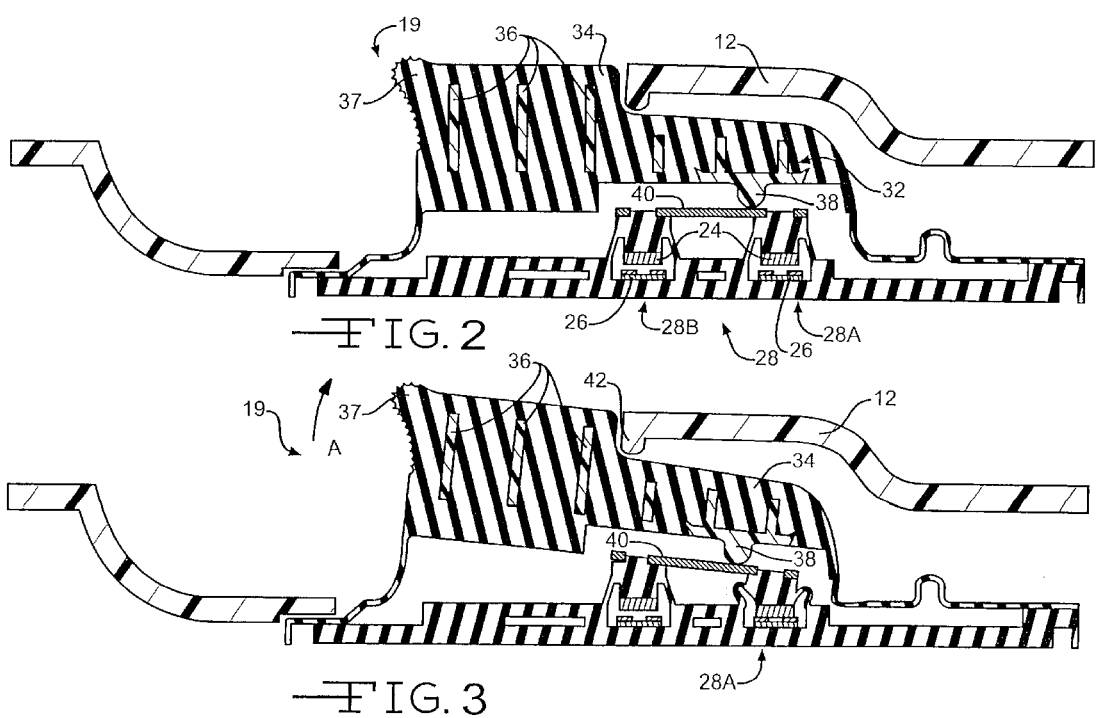

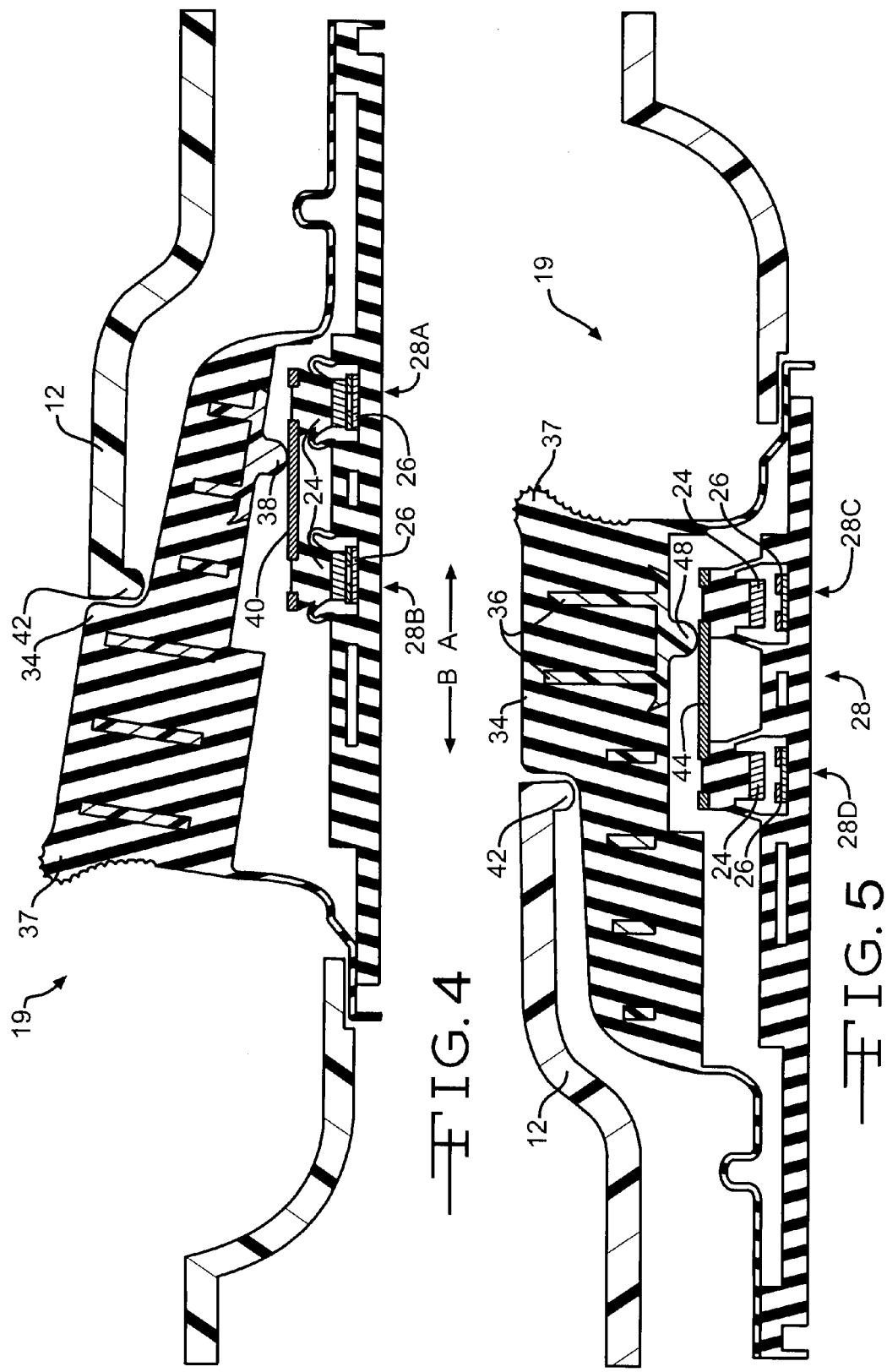

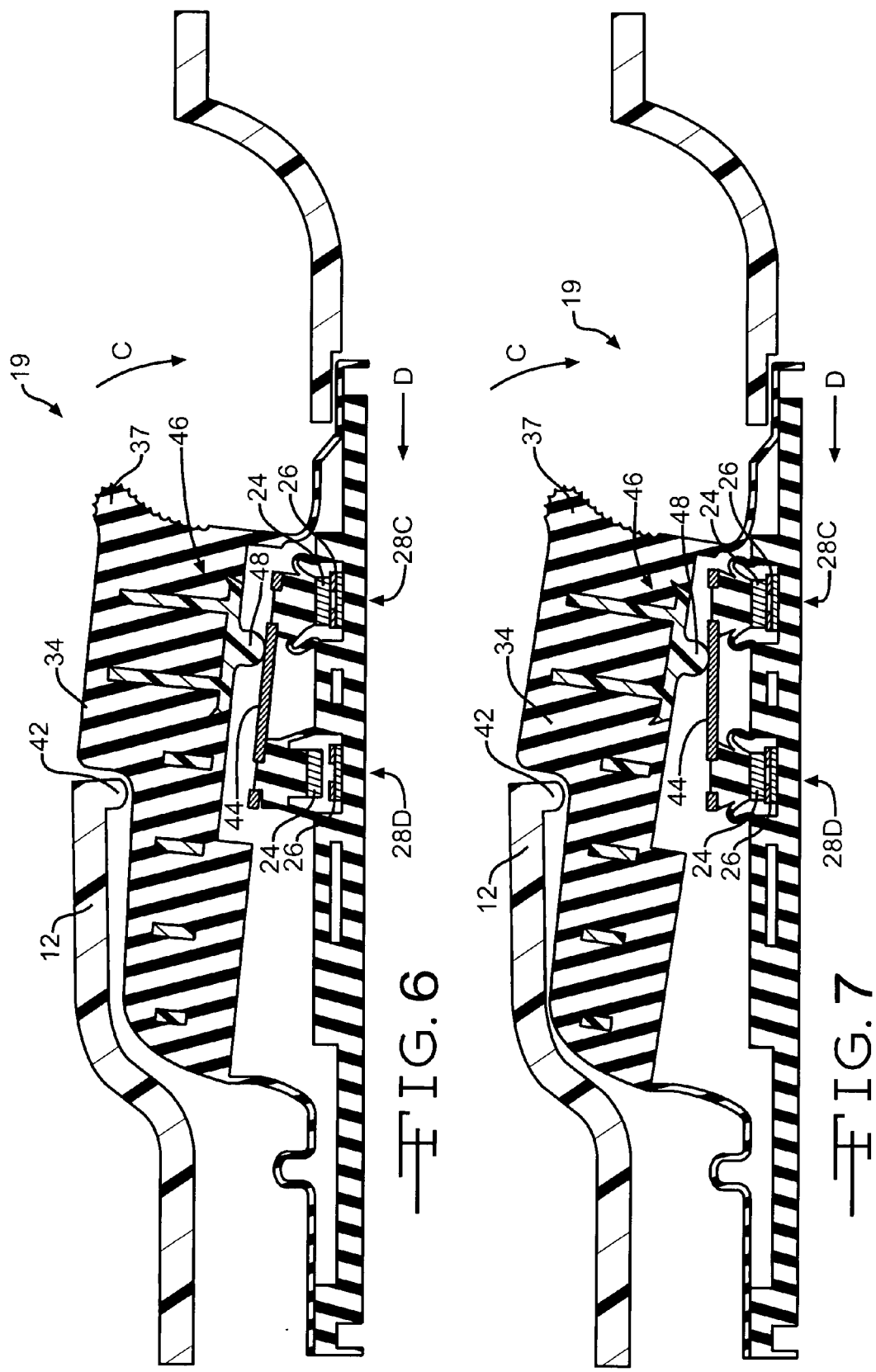

ELASTOMERIC VEHICLE CONTROL SWITCH

BACKGROUND OF THE INVENTION

This invention relates in general to vehicle control switch assemblies, and more specifically to control switches having an elastomeric pad.

A conventional switch bank (or array) is typically formed having a stacked (i.e., overlaid) structure. The switch bank is implemented to carry a low voltage DC signal. The switch bank is a group of normally open, single pole, single throw (NO, SP, ST) momentary contact device switches. The switch bank can include a graphic overlay having painted or printed on symbols that relate to numbers, vehicle functions, and the like depending on the application of the switch bank. For example, the overlay is disposed over an electrostatic discharge (ESD)/electromagnetic interference (EMI) shield. In another example, the overlay is disposed directly over a top membrane or elastomeric pad. The membrane has a number of contacts that align with the respective symbols when the switch bank is properly assembled.

The switch bank typically also includes a spacer disposed under the membrane. The spacer has holes that generally align with respective contacts in the membrane. A bottom membrane (or circuit board) includes circuit grids that generally align with the respective contacts such that a respective circuit is closed when a user sufficiently depresses the respective symbol. The switch bank can also include a subpanel (i.e., substrate, back cover, etc.) that generally provides physical support. The stackup or overlay of the respective symbol, contact, hole, and grid forms an individual switch in the switch bank.

The conventional switch bank has a number of deficiencies such as that when the switch bank is manufactured, the layers (i.e., the overlay, the membrane, the spacer, the circuit board, and the sub-panel) can be difficult to align such that the respective symbols, holes, and circuits align properly, the switch bank is not lighted or backlit, the overlay and the symbols are not registered (i.e., the surface of the overlay is substantially smooth such that a user can not readily discern switch location and type by feel), and the switch bank does not provide tactile feedback feel to the user. Additionally, conventional switch banks, particularly rocker type switches with opposed contacts for first and second functions lack sufficient structural strength to prevent both contacts from being made when multiple forces are applied.

These types of switches are conventionally used for electrically actuated components, such as for example, seat adjustment mechanisms, mirror adjustment mechanisms, door locks, window lifting devices, pedal adjustment mechanisms, and steering column adjustment mechanisms, or any other electrically actuated controls.

With respect to switches and controls for power windows, there are typically two modes for closing or opening a vehicle window. The first mode is commonly referred to as "up" or "conventional up", and "down" or "conventionally down". All power window systems have this mode. While an "up" button is pressed, the window is driven up. When the button is released, the window stops. Thus, in conventional "up" mode, the operator ultimately decides when to start and stop closing the window. Similarly, when the "down" button is pressed, or the same "up" button is actuated in the opposite direction, the window is driven down. Many vehicles, however, include a second mode commonly referred to as "express up" and "express down". When the "express up" button is pressed, the window is driven closed (i.e. locked in the "up" position) even if the user is no longer pressing the "express up" button, and vice versa. So long as the user doesn't press a contrary button, such as "down" while the window is in "express up" mode, window controls interpret the "express up" command to mean that the window should be driven all the way to its fully closed position. A similar operation is performed to move the window into a fully open position.

SUMMARY OF THE INVENTION

The invention relates to a vehicle control switch assembly for use with a printed circuit board for controlling the position of a window, the switch including an express up and express down feature. The vehicle control switch assembly for use with a printed circuit board includes a switch having an elastomeric pad portion and a first insert interface attached thereto. It also includes a first electrical contact and a second electrical contact, each contact being selectively operable to actuate a vehicle function. The switch assembly also has a pivotable beam member bridging a span between the first electrical contact and the second electrical contact. Movement of the switch in a first direction causes the first insert interface to depress the beam member thereby engaging the first electrical contact with the printed circuit board to actuate the first electrical contact. Further movement of the switch in the first direction causes the first insert interface to slide along the beam member in a second direction to further depress the first beam member thereby actuating the first electrical contact and the second electrical contact.

The invention also relates to a vehicle control switch assembly having a printed circuit board, a switch having an elastomeric pad portion, a first insert interface, a first electrical contact and a second electrical contact each contact being selectively operable to actuate a vehicle function, and a pivotable first beam member bridging a span between the first electrical contact and the second electrical contact. The switch is configured to be pivoted in a first direction about a first pivot point to actuate the first electrical contact and is configured to be pivoted further in the first direction about a second pivot point to actuate both the first and second electrical contacts.

Various objects and advantages of this invention will become apparent to those skilled in the art from the following detailed description of the preferred embodiments, when read in light of the accompanying drawings.

BRIEF DESCRIPTION OF THE DRAWINGS

FIG. 2 is a cross-sectional view through Line 2-2 of a switch shown in FIG. 1 in a neutral position.

FIG. 3 is a cross-sectional view through Line 2-2 of the switch shown in FIG. 1 in a first actuation position.

FIG. 4 is a cross-sectional view through Line 2-2 of the switch shown in FIG. 1 in a second actuation position.

FIG. 5 is a cross-sectional view through Line 5-5 of the switch shown in FIG. 1 in a neutral position.

FIG. 6 is a cross-sectional view through Line 5-5 of the switch shown in FIG. 1 in a third actuation position.

FIG. 7 is a cross-sectional view through Line 5-5 of the switch shown in FIG. 1 in a fourth actuation position.

DETAILED DESCRIPTION OF THE PREFERRED EMBODIMENTS

Figure 1:
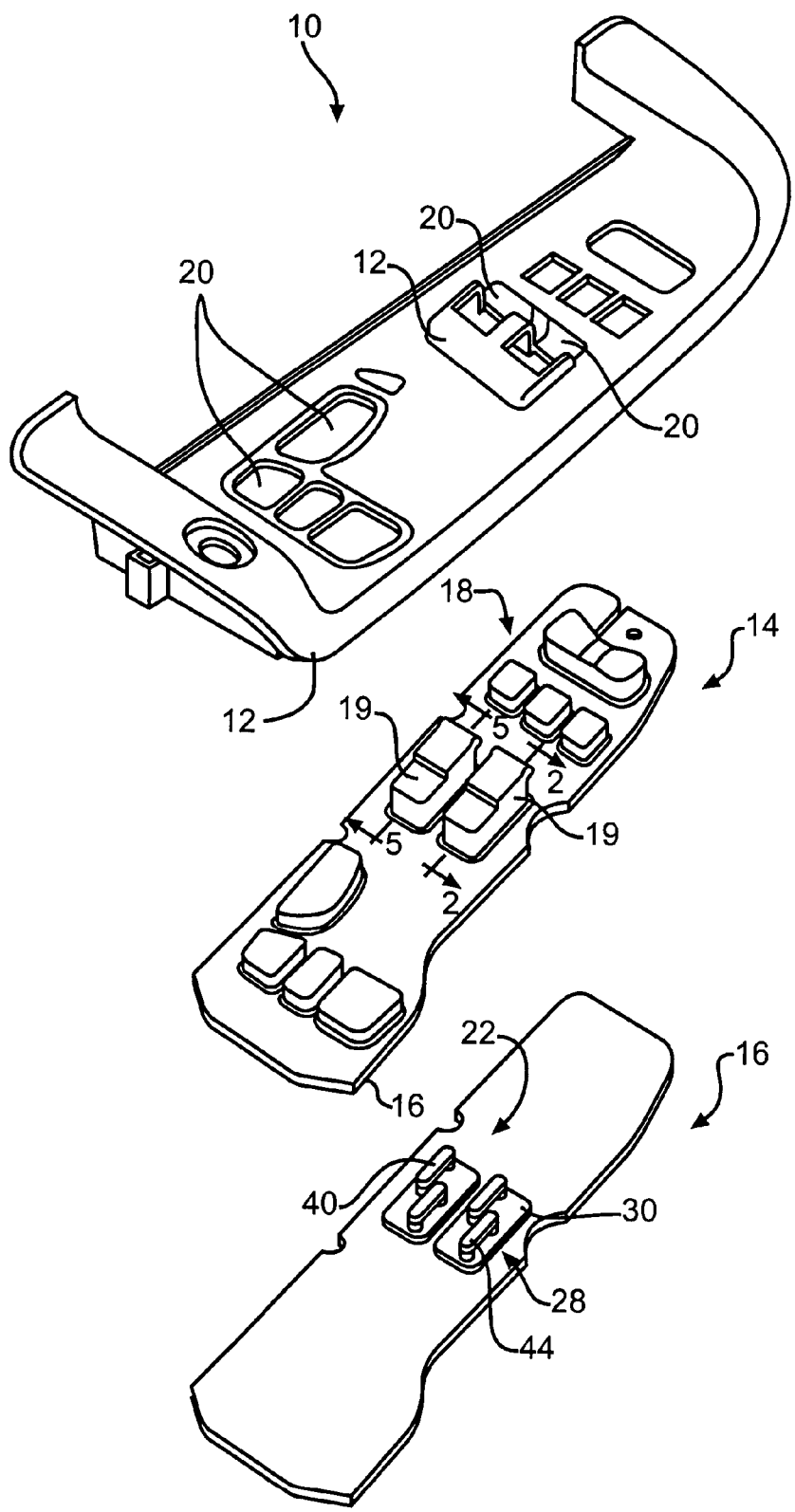
FIG. 1 is an exploded perspective view of a bezel housing and a switch assembly according to the present invention.

Vehicle interior passenger compartments are, in large measure, conventional in the art. The typical vehicle interior passenger compartment includes an instrument panel or dashboard. The instrument panel may include control mechanisms and switches for various components of the vehicle, such as, temperature and climate controls system, audio and video systems, windows, seat and mirror positioning mechanisms, and navigational systems. These controls may be positioned within the instrument panel, a lower console, doors, or any other suitable location within the interior of the vehicle. Alternatively, a second storage compartment (not shown) may be provided in the back seat area and can also have various controls (climate, windows, video gaming device controls, audio controls, headphone jacks, etc.) located thereon. An overhead console (not shown) can also be accessible from within the interior passenger compartment of the vehicle. The overhead console can contain various controls, such as a garage door opener, climate controls, etc. A rear overhead console can include a video display screen, climate controls, and other audio controls. Other vehicle controls that regulate user modifiable parameters typically include seat positions for a vehicle driver seat (fore/aft position, seat height, seat back angle, etc.), audio and video presets, rearview and side view mirror positions, temperature control settings, seat belt height, steering wheel position, accelerator/brake pedal positions, interior light colors and intensity, airbag activation and sensitivity conditions. Other vehicle controls not specifically listed can also be used to control many other settings. The majority of these components are typically controlled electronically by switches. It should be appreciated that the scope of this invention is not intended to be limited for use with the specific structure and controls for the vehicle interior passenger compartment described above, or with vehicle interior passenger compartments in general. On the contrary, as will become apparent below, this invention may be used in any desired environment for the purposes described below.

Referring now to the drawings, there is illustrated in FIG. 1 an exploded perspective view of a control switch assembly 10 including a bezel housing 12 and a switch array 14 underlying the housing 12 according to the present invention. The switch array 14 includes at least one, and can include a plurality of, layers or substrates 16 which will be described in greater detail below with respect to FIG. 2. The switch array 14 includes multiple control switches or buttons 18 that are each configured to actuate a control mechanism (not shown) that operates a device such as those listed above (i.e. vehicle seats, windows, etc.). The illustrated control switches 18 can be of a rocker type, push button type, slider type, or any other type of button that is moveable by a vehicle operator to control a designated vehicle operation. The housing 12 has a plurality of openings 20 formed through the housing 12. The housing 12 is configured to fit over the switch array 14 and the openings 20 are sized and shaped to fit over the control switches 18. The housing 12 also acts to generally position the switches 18. It is preferred that when the control switch assembly 10 is assembled, the control switches 20 protrude through the housing 12 such that the control switches 18 can be accessed by a vehicle operator. It should be appreciated that a control switch assembly 10 (having a greater or fewer number of switches 19) according to the present invention can be positioned anywhere within the vehicle passenger compartment so that the switches 19 can be accessed by any occupant of the vehicle.

The housing 12 can be formed as a separate component to be assembled with another vehicle interior component, or can be integrally formed as part of a vehicle console, door panel or other vehicle interior component. The housing 12 is a vehicle interior component that is generally conventional in the art. The housing 12 may be disposed on the printed circuit board 30 and/or an elastomeric membrane or pad 34 (shown in FIG. 2). The housing 12 may be made of any conventional material (e.g. molded plastic) used with switch assemblies or instrument panel housings. The housing 12 may also include various other apertures or flanges to facilitate the mounting of the housing 12 to the circuit board 30 and/or an elastomeric pad 34. The housing 12 may also include various other apertures or flanges to facilitate the mounting of the switch array 14 or other additional switch assemblies or for connecting the control switch assembly 10 to the vehicle.

Indicated generally at 16 is a substrate of the control switch assembly 10. The substrate can be formed as a part of a printed circuit board, or have a printed circuit board 30 formed thereon as a part of the substrate, or can be entirely formed as a printed circuit board. Underlying the control switches, generally indicated at 18, and more specifically referring to two specific switches indicated at 19, are switch control mechanisms, indicated generally at 22. The switch control mechanisms 22 will be described in greater detail below with respect to FIGS. 2-7. Although the control switch assembly 10 is shown in an exploded view in FIG. 1, it should be appreciated that any or all of the layers shown in FIG. 1 can be formed integrally with each other without departing from the spirit or scope of the invention.

Illustrated in FIG. 2 is a cross-sectional view of the switch 19 shown in FIG. 1 through the Line 2-2. As illustrated in FIG. 1, the two switches 19 are substantially identical in construction and operation, and therefore the following description applies equally to both switches. Additionally, although two of such switches are shown in FIG. 1, it should be appreciated that any number of such switches could be used with the control switch assembly 10 of FIG. 1. The illustrated switch 19 is of a rocker-type that is configured to be selectively movable in one of multiple positions. In the preferred embodiment, the switch 19 is movable into one of five positions (neutral, first actuation position, second actuation position, third actuation position, and fourth actuation position). However, the switch 19 can be configured to be positioned in an infinite number of positions. As illustrated in FIG. 2, the switch 19 is in a neutral position. In the neutral position, the electrical contacts, indicated generally at 28, are disengaged from the underlying printed circuit board 30. Each electrical contact 28 includes a contact pad 24 and contact surface 26. The electrical contact 28 becomes actuated when each contact 24 is brought into engagement with its associated contact surface 26. The contact surface 26 is preferably in electrical communication with the printed circuit board 30 so that an electrical circuit is formed when the electrical contact 28 is in an engaged position (i.e. the contact 24 is brought into engagement with the contact surface 26). Such an electrical contact may be a contact dome of a dome or membrane switch, as is known in the art. The circuit board 30 may be a conventional printed circuit board including conductive traces for implementing conventional switch functions. The circuit board 30 preferably includes the contact surfaces 26 formed thereon, for engagement with respective contact pads 24 formed on the switch 19, as is shown in FIG. 2. However, the circuit board 30 may include various other contacts or conductive traces for implementing desired switch functions, as will be described herein in accordance with the present invention.

The switch 19 includes an elastomeric pad portion 34 that defines the body of the switch 19. The elastomeric pad portion 34 may be a conventional elastomer pad suitable for use with switches, such as dome switches or membrane switches. The elastomeric pad 34 used herein may cover a portion of the circuit board 30 as well. It should be appreciated that the elastomeric pad 34 may cover an entire surface of the circuit board 30 or any portion thereof. At least a portion of the elastomeric pad 34 may be configured to transmit light therethrough or be adapted to be a light pipe to allow illumination of an outer surface of the elastomeric pad portion 34.

Positioned adjacent the elastomeric pad 34 is a first insert interface 32. The first insert interface 32 can be made of any suitable material such that the first insert interface 32 is more rigid than the elastomeric pad 34. In a preferred embodiment, the first insert interface 32 is a rigid plastic member. It should be appreciated that the first insert interface 32 can also be a semi-rigid plastic member, a flexible metal member, or an elastomeric member. As shown, the first insert interface 32 includes a plurality of ribs 36 extending crosswise across the width of the switch 19. The ribs 36 can be interconnected by longitudinally extending beams (not shown). The ribs 36 and beams can be molded as a single piece or can be formed as separate components that are joined together to form the first insert interface 32. Although the first insert interface 32 is shown as having a plurality of ribs 36, it can be appreciated that the first insert interface 32 can have any suitable shape and structure, such as being a continuous solid plastic insert. Formed at a lower portion of the first insert interface 32 is a first ball 38. The first ball 38 is shown as a rounded protrusion extending from a lower surface of the first insert interface 32 and acts as a first pivot point for the switch 19 when moved in a first direction (indicated by arrow A, and as shown in FIG. 3). The ball 38 is configured to cooperate with a first beam member 40 for movement therewith. In the preferred embodiment, the first beam member 40 bridges the span between the set of electrical contacts 28 shown in FIG. 2. As shown, there is a first electrical contact 28A and a second electrical contact 28B. The contact pad 24 can be formed integrally with the beam member 40 or the beam member 40 can be supported with an elastomeric portion of a dome switch.

Illustrated in FIG. 3, the switch 19 is shown pivoted into the first actuation position. The pivoting of the switch 19 is in a first direction, indicated by the arrow A, such as when the switch 19 is lifted by a user. The switch 19 is shown having a tab 37 formed on the outer surface of the elastomeric pad 34 to provide a feature to facilitate the ability of a user to grasp and operate the switch. When pivoted in the first direction, A, the elastomeric pad 34 compresses slightly and forces the switch 19 in the first direction, pivoting about the ball 38. With the force being applied to the switch 19 and the switch 19 pivoting about the ball 38 in the first direction, A, there will also be a downward component of the force that is applied to the beam member 40. This downward component of force will cause the beam member 40 to actuate the first electrical contact 28A. For example, in an embodiment using a dome switch, the dome would be compressed moving the contact pad 24 into engagement with the contact surface 26. In the preferred embodiment, such pivoting movement of the switch 19 generally corresponds with the operation of the switch 19 to control the movement of a vehicle window. For example, movement of the switch shown in FIG. 3, would operate the window in a "down" direction.

Illustrated in FIG. 4, the switch 19 is shown pivoted further in the first direction, A, and is moved into the second actuation position. Such further pivoting movement of the switch 19 generally corresponds with the operation of the switch 19 to control the movement of the window in an "express down" manner. As shown in FIG. 4, the switch 19 will pivot about a second pivot point 42 when pivoted further in the first direction, A. As shown in the Figures, the second pivot point 42 is formed at an upper surface of the switch assembly 10 and is preferably formed integrally with the housing. As shown, the housing 12 overlaps a portion of the body of the switch 19. As the switch is moved further in the first direction A, the switch 19 will press against the second pivot point 42. The force applied by the user to the switch 19, against the second pivot point 42, will cause a force transfer from the second pivot point 42 to the ball 38 and thus, to the beam member 40. As the force pivots the switch 19 against the second pivot point 42 the ball 38 will slide in the first sliding direction, indicated by arrow B. As the ball 38 slides in the first sliding direction, B, the point where the force is applied to the beam member 40 will move in the first sliding direction, B. As a result, the beam member 40 will tilt downward and cause actuation of the second electrical contact 28B. For example, in an embodiment using the dome switch, the dome would be compressed thereby moving the contact pad 24 into engagement with the contact surface 26. In the switch position shown in FIG. 4, both electrical contacts 28A and 28B will be actuated. It is preferred that in this position, the printed circuit board 30 will create an electrical circuit, thereby allowing the associated vehicle operation (window "express up") to operate.

When the switch 19 is moved into the second actuation position, it is preferred that the switch is locked in the second actuation position until the associated vehicle function is completed, even if the switch 19 is released by the user. For example, with the associated vehicle function being window operation, in the second actuation position, the window would be locked in the "express up" position until the window was completely closed. Alternatively, locking the window in the "express up" position can comprise both electrical contacts 28 being engaged thereby creating an electrical impulse indicating that an "express up" function is to be performed and such an electrical impulse is operated until the window is in the full "up" position. The window will complete this function regardless of the position of the switch 19 unless the switch 19 is moved in the opposite (down) position. The switch 19 can also include a return mechanism (not shown) that automatically returns the switch 19 from the second actuation position to the neutral position after the switch 19 is released and the object of the operation is completed. Additionally, there can be a return mechanism (the same return mechanism or a different mechanism) that moves the switch 19 from the first actuation position to the neutral position such that the switch is returned to the neutral position when the switch 19 is released by the user. In the preferred embodiment, the resilient forces of the electrical contacts 28 act as the return mechanism for the switch. As described above, an example of a switch having this configuration is a window control switch in a vehicle. Typically, since a window can be opened or closed to varying degrees, the switch such as shown in FIGS. 1-4 is held in an engaged position by the user until the desired degree of openness is achieved. It should be appreciated that the term "locked" also means that the function is locked. Particularly, the signal sent to the controller when the switch 19 is moved into the second actuation position can indicate to the controller to perform the express function even if the switch 19 returns to the neutral position. Therefore, the switch 19 does not have to be physically locked in the specific actuation position.

Illustrated in FIGS. 5-7, the switch 19 is shown in cross-sectional view through Line 5-5 of FIG. 1. These Figures illustrate the switch 19 in each of the neutral position (FIG. 5), the third actuation position (FIG. 6), and in the fourth actuation position (FIG. 7). In FIGS. 5-7, some components of the switch 19 are common to those shown in FIGS. 1-4. Therefore, those components are illustrated again and are given like reference numerals. In FIGS. 5-7, a second beam member 44, and third and fourth electrical contacts 28C and 28D are shown. The third and fourth electrical contacts 28C and 28D are substantially similar to the electrical contacts 28A and 28B in structure and operation. The electrical contacts 28C and 28D comprise contact pads 24 and contact surfaces 26. The switch 19 also includes a second insert interface 46 positioned at the opposite end of the switch 19 than the end of the switch 19 having the first insert interface 32. The relative positions of the beam members 40 and 44 can be seen in FIG. 1. Therefore, the positions of the insert interfaces 32 and 46 are staggered so that the insert interfaces 32 and 46 on the inner surface of the switch 19 can cooperate with the respective beam members 40 and 44 to operate the switch 19 as is described herein.

The operation of the switch 19 in the second pivoting direction, C, is substantially similar to that which was described above with respect to the switch operation in the direction A. As shown in FIG. 5, the switch 19 is in the neutral position with neither of the electrical contacts 28 being actuated, and therefore, no related vehicle operation being performed. Illustrated in FIG. 6, the switch 19 is in the third actuation position with the second beam member 44 being pivoted towards the third electrical contact 28C and that contact 28C being actuated. In this position, the vehicle operation being performed would be a normal "down" control of the window. Illustrated in FIG. 7, the switch is in a fourth actuation position with the third and fourth electrical contacts 28C and 28D being actuated by further sliding of the ball 48 in the second sliding direction D. In this position, the vehicle operation being performed would be the "express down" control of the window. Moving from FIG. 5 to FIG. 7, the switch 19 is being pivoted from the neutral position in the second pivoting direction, C, in FIG. 6 and then further in the second pivoting direction, C, in FIG. 7. As with the pivoting of the switch 19 described with respect to FIGS. 2-4, the switch 19 first pivots about a first pivot point (the ball 48 formed on the second insert interface 46) when initially moved in the second pivoting direction, C. Further pivoting of the switch 19 in the second pivoting direction, C, causes the switch 19 to pivot about the second pivot point 42 that is formed on the housing 12 of the control switch assembly 10. As shown in the Figures, the second pivot point 42 is formed at an upper surface of the switch assembly 10 and is preferably formed integrally with the housing 12.

In the preferred embodiment, the elastomeric pad 34 is molded to the first insert interface 32 to secure the two components together. In the embodiments shown in the Figures, the first insert interface 32 is molded to a lower portion of the elastomeric pad 34. However, it can be appreciated that the first insert interface 32 can be molded entirely within the elastomeric pad 34. The various beams and ribs 36 of the insert interface 32 can aid in retaining the elastomeric pad 34 with the first insert interface 32. The first insert interface 32 can also include additional roughed surfaces, divots or other features to help retain the elastomeric pad 34 with the first insert interface 32 during a molding operation. The second insert interface 46 is preferably molded to the elastomeric pad 34 in a similar manner.

As described above, any of a plurality of types of light sources can be used to illuminate the switch 19 by including a light pipe or any other suitable illuminating device. A suitable illuminating device can include an incandescent bulb or a light-emitting diode (LED), a lens, and a reflector or collimating surface for directing the light toward the lens. If so desired, more than one light source can be used. At least a portion of the elastomeric pad 34 may filter light therethrough. For example, a portion of the elastomeric pad 34 may transmit light therethrough and may be a translucent color, such that the light transferred therethrough is tinted to a desired color. It will be appreciated that at least a portion of the elastomeric pad 34 may be comprised of various layers of elastomer, each layer having various light transmission and/or filtering capabilities. The transmission or filtration of light through the elastomeric pad 34 may be desirable to illuminate an indicator or graphic on the switch 19 or on a portion of a housing disposed over a portion of the elastomeric pad 34. Alternatively, a graphic can be printed directly onto the elastomeric pad 34 (such as a molded through graphic), or a translucent overlay having a graphic printed or etched thereon on can be positioned over a portion of the elastomeric pad. Regardless of the manner in which a graphic or indicator is made for the switch, the LED and light pipe act to illuminate (back-light) the graphic for ease of viewing by the user of the vehicle.

In an alternate embodiment, the switch 19 could be configured to operate between a neutral position, a first, second, third and fourth actuation position (as described above), or any desired number of positions, to operate a non-window vehicle function. For example, the switch 19 could be used to operate a door locking mechanism, such that the first actuation position activates the locking mechanism on the driver's door to a locked position, the second actuation position activates the lock for all the vehicle's doors, the third actuation position activates the locking mechanism on the driver's door lock to an unlocked position, and the fourth actuation position activates all the locks to an unlocked position. Alternatively, the control switch assembly 10 can be configured to control any vehicle function that can be controlled electronically, or is desired to be controlled electronically.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A control switch assembly comprising:
   a switch including an insert interface, the switch being movable in a pivoting direction;
   first and second electrical contacts that are selectively movable to actuate first and second functions, respectively; and
   a movable beam member engaging the insert interface and bridging a span between the first and second electrical contacts;
   wherein movement of the switch in the pivoting direction causes the insert interface to slide along the beam member in a sliding direction and thereby cause the beam member to engage the first electrical contact and actuate the first function; and wherein further movement of the switch in the same pivoting direction causes the insert interface to slide further along the beam member in the same sliding direction and thereby cause the beam member to engage both the first and second electrical contacts and actuate both the first and second functions.

2. A control switch assembly comprising:

a switch including first and second insert interfaces, the switch being movable in first and second pivoting directions;

first and second electrical contacts that are selectively movable to actuate first and second functions, respectively;

a first movable beam member engaging the first insert interface and bridging a span between the first and second electrical contacts;

third and fourth electrical contacts that are selectively movable to actuate third and fourth functions, respectively; and a second movable beam member engaging the second insert interface and bridging a span between the third and fourth electrical contacts;

wherein movement of the switch in the first pivoting direction causes the first insert interface to slide along the first beam member in a first sliding direction and thereby cause the first beam member to engage the first electrical contact and actuate the first function; and wherein further movement of the switch in the first pivoting direction causes the first insert interface to slide further along the first beam member in the first sliding direction and thereby cause the first beam member to engage both the first and second electrical contacts and actuate both the first and second functions;

wherein movement of the switch in the second pivoting direction causes the second insert interface to slide along the second beam member in a second sliding direction and thereby cause the second beam member to engage the third electrical contact and actuate the third function; and wherein further movement of the switch in the second pivoting direction causes the second insert interface to slide further along the second beam member in the second sliding direction and thereby cause the second beam member to engage both the third and fourth electrical contacts and actuate both the third and fourth functions.

* * * * *